(12) United States Patent
Mori

(10) Patent No.: US 8,970,922 B2
(45) Date of Patent: Mar. 3, 2015

(54) IMAGE FORMING APPARATUS

(71) Applicant: Hirotaka Mori, Nagoya (JP)

(72) Inventor: Hirotaka Mori, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/168,029

(22) Filed: Jan. 30, 2014

(65) Prior Publication Data

US 2014/0211283 A1    Jul. 31, 2014

(30) Foreign Application Priority Data

Jan. 30, 2013    (JP) .................................. 2013-015897

(51) Int. Cl.
*H04N 1/04*    (2006.01)
*H04N 1/00*    (2006.01)

(52) U.S. Cl.
CPC ......... *H04N 1/00591* (2013.01); *H04N 1/0053* (2013.01); *H04N 2201/0094* (2013.01)
USPC ............ 358/474; 358/498; 358/497; 399/367

(58) Field of Classification Search
CPC .............. H04N 1/193; H04N 1/00567; H04N 1/00519; H04N 1/00543; H04N 2201/0081; H04N 1/00681; H04N 1/1225
USPC ........ 358/498, 1.13, 474, 1.1, 1.14, 1.15, 1.5, 358/451, 486, 496, 505, 509; 399/367; 271/264
See application file for complete search history.

(56) References Cited

U.S. PATENT DOCUMENTS

| | | | |
|---|---|---|---|
| 5,881,351 A | 3/1999 | Shimotoso et al. | |
| 6,102,506 A | 8/2000 | Sasai et al. | |
| 6,390,463 B1 * | 5/2002 | Iwago | 271/118 |
| 8,668,199 B2 * | 3/2014 | Abe et al. | 271/228 |
| 8,668,200 B2 * | 3/2014 | Iijima et al. | 271/272 |
| 8,755,097 B2 * | 6/2014 | Fujita et al. | 358/498 |
| 8,862,647 B2 * | 10/2014 | Shibayama | 708/200 |
| 8,870,179 B2 * | 10/2014 | Shiraishi et al. | 271/31 |
| 8,875,509 B2 * | 11/2014 | Glezer et al. | 60/641.11 |

FOREIGN PATENT DOCUMENTS

| | | |
|---|---|---|
| JP | 06-194893 A | 7/1994 |
| JP | 09-230653 A | 9/1997 |
| JP | 09-304986 A | 11/1997 |
| JP | 2002-111935 A | 4/2002 |
| JP | 2005-333446 A | 12/2005 |
| JP | 2005-333448 A | 12/2005 |

* cited by examiner

*Primary Examiner* — Negussie Worku
(74) *Attorney, Agent, or Firm* — Banner & Witcoff, Ltd.

(57) ABSTRACT

An image forming apparatus, comprising: a housing; an image formation unit configured to form an image on a recording medium; a stacking tray configured such that the recording medium on which an image has been formed by the image formation unit is stacked; a discharge unit configured to discharge, to the stacking tray, the recording medium on which an image has been formed by the image formation unit; and a reading device comprising a reading unit configured to read out an image formed on a document and a reversing unit configured to reverse a conveying direction of the document, and wherein the reading device is disposed on a lower side in a vertical direction with respect to the stacking tray and on a downstream side in a discharging direction of the recording medium discharged from the discharge unit with respect to the discharge unit.

11 Claims, 6 Drawing Sheets

IMAGE FORMING APPARATUS

CROSS-REFERENCE TO RELATED APPLICATION

This application claims priority under 35 U.S.C. §119 from Japanese Patent Application No. 2013-015897, filed on Jan. 30, 2013. The entire subject matter of the application is incorporated herein by reference.

BACKGROUND

1. Technical Field

Aspects of the present invention relate to an electrophotographic image forming apparatus.

2. Related Art

A multifunction peripheral comprising an image formation unit configured to form an image on a sheet and an image reading unit configured to read out an image from a document is known.

One of such multifunction peripherals is configured such that the image formation unit includes, on an upper end portion thereof, a sheet discharge tray to which a sheet on which an image has been formed is discharged, and a discharge roller which discharges the sheet to the sheet discharge tray. In this configuration, the image reading unit is disposed on the upper side with respect to the sheet discharge tray and the discharge roller.

SUMMARY

Recently, the demand for downsizing the multifunction peripheral is further increasing in view of flexibility of installation space. However, in the multifunction peripheral described above, the image reading unit is disposed on the upper side of the discharge roller, and specifically the image reading unit is disposed directly above the discharge roller, which limits downsizing of the multifunction peripheral in the up and down direction.

Aspects of the present invention are advantageous in that they provide an image forming apparatus configured to be able to achieve downsizing in the vertical direction while including a reading device therein.

According to an aspect of the invention, there is provided an image forming apparatus, comprising: a housing; an image formation unit that is provided in the housing and is configured to form an image on a recording medium; a stacking tray configured such that the recording medium on which an image has been formed by the image formation unit is stacked; a discharge unit configured to discharge, to the stacking tray, the recording medium on which an image has been formed by the image formation unit; and a reading device comprising a reading unit configured to read out an image formed on a document and a reversing unit configured to reverse a conveying direction of the document. In this configuration, the reading device is disposed on a lower side in a vertical direction with respect to the stacking tray and on a downstream side in a discharging direction of the recording medium discharged from the discharge unit with respect to the discharge unit.

BRIEF DESCRIPTION OF THE ACCOMPANYING DRAWINGS

DETAILED DESCRIPTION

Hereafter, embodiments according to the invention will be described with reference to the accompanying drawings.

First Embodiment

1. Configuration of Printer

Figure 1:
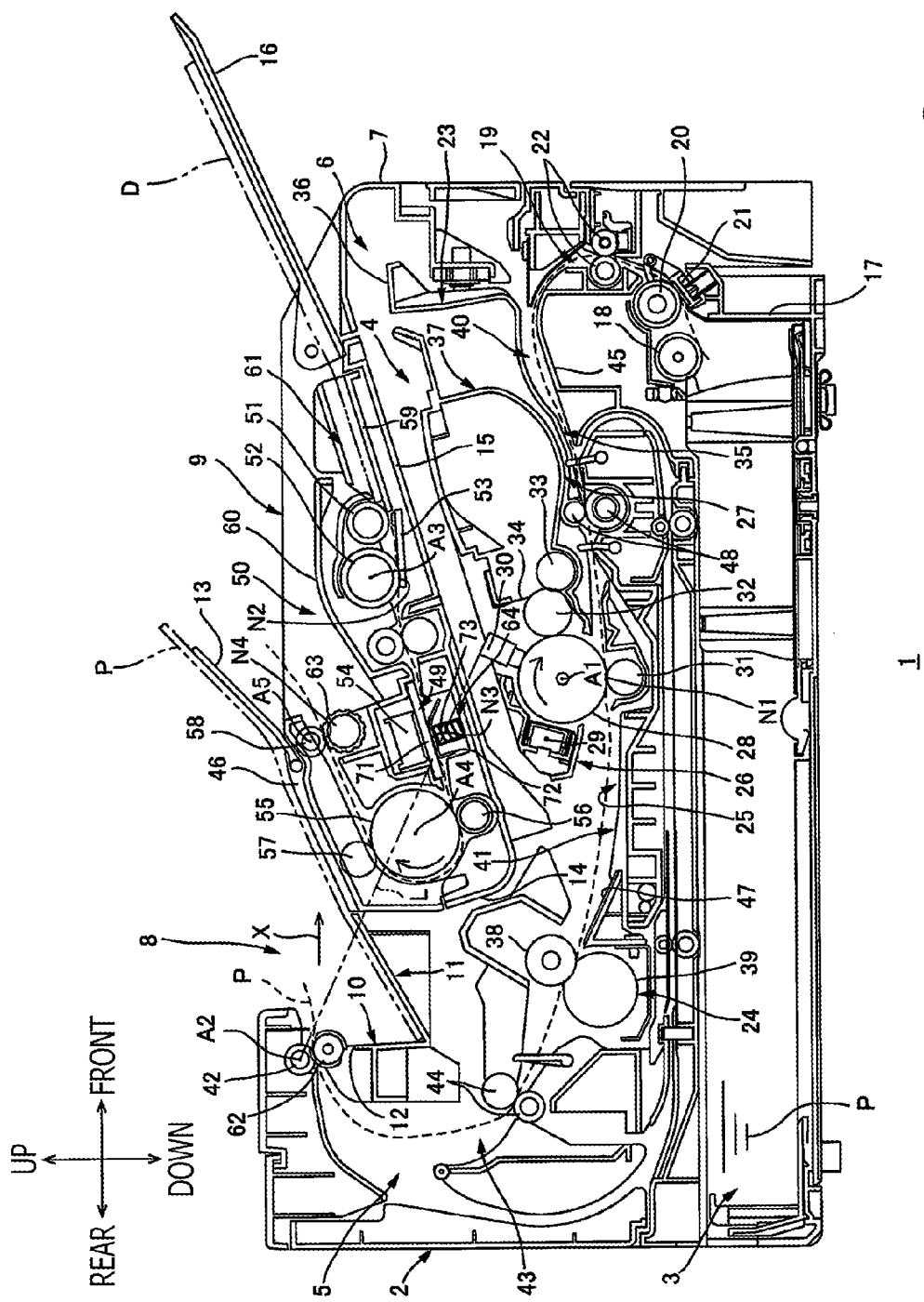
FIG. 1 is a cross sectional view illustrating a central portion of a printer 1 according to a first embodiment.

As shown in FIG. 1, a printer 1 which is an example of an image forming apparatus includes a body casing 2 which is an example of a housing and a reading unit 50 which reads out image data from a document D. That is, the printer 1 is configured as a multifunction peripheral.

(1) Body Casing

The body casing 2 is formed in a box-shape and has a rectangular shape when viewed as a side view. The body casing 2 includes therein a paper supply unit 3 configured to supply a sheet of paper P, an image formation unit 4 configured to form an image on the supplied sheet of paper P, and a discharge unit 5 configured to discharge the sheet of paper P, on which an image has been formed by the image formation unit 4, to the outside of the body casing 2.

In one side wall of the body casing 2, an attaching and detaching opening 6 through which a process cartridge 23 (which is described later) is detachably attachable to the printer 1 is formed. Further, a front cover 7 configured to open or close the attaching and detaching opening 6 is provided on the one side wall.

In the following, directions regarding the printer 1 are referred to with reference to a state where the printer 1 is horizontally placed. Specifically, as shown by arrows in FIG. 1, a side on which the front cover 7 is provided, i.e., a right side on a paper face of FIG. 1, is defined as a front side, and an opposite side of the front side is defined as a rear side. The right and left directions are defined in a state of being viewed from the front side. That is, a forehand side on the paper face of FIG. 1 is the left side, and a back side on the paper face of FIG. 1 is the right side. The front and rear direction and the left and right directions are a horizontal direction and a vertical direction, respectively.

The front cover 7 is provided to be swingable about a lower end thereof as a supporting point, between a closed position where the front cover 7 covers the attaching and detaching opening 6 and an opened position where the attaching and detaching opening 6 is opened. In FIG. 1, the front cover 7 situated at the closed position is shown, and the front cover 7 situated at the opened position is not shown.

On an upper surface of the body casing 2, a discharge tray 8 and a reading recessed part 9 in which the reading unit 50 is accommodated are formed.

Figure 2A:
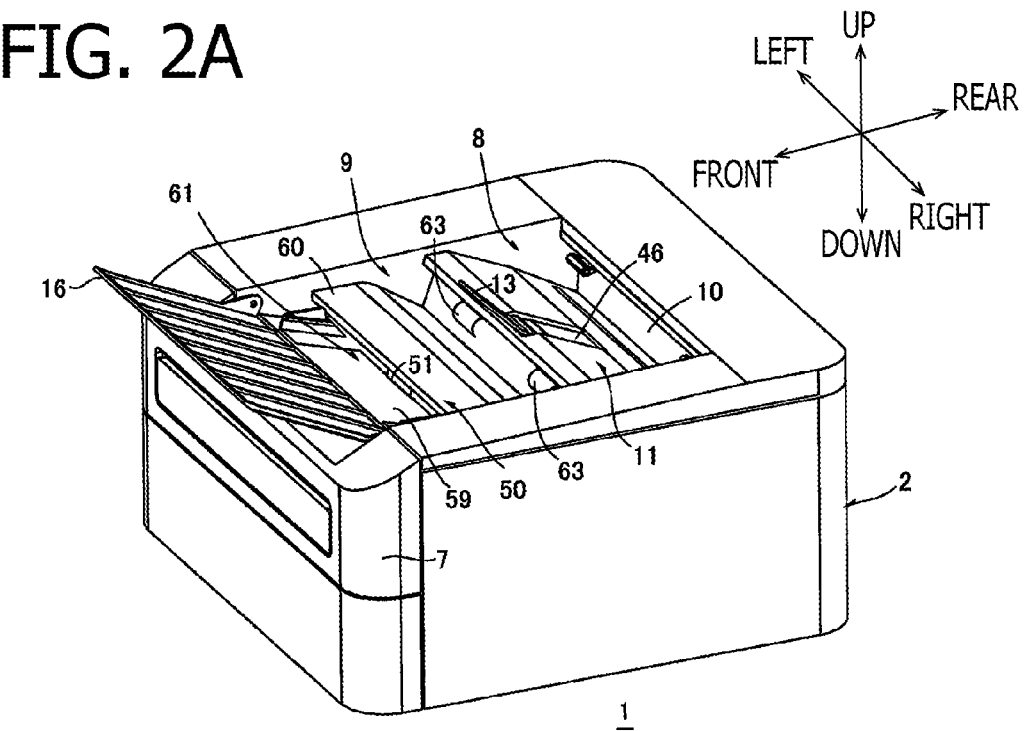
FIG. 2A is a perspective view in which the printer shown in FIG. 1 is viewed from the upper right side and a reading cover is at an opened position.

As shown in FIG. 2A, the discharge tray 8 is formed as a recessed part which is recessed downward, from the upper surface of the body casing 2, at the central portion of the upper surface of the body casing 2. As shown in FIG. 1, the discharge tray 8 is integrally provided with a restriction wall 10 and a slanting wall 11.

The restriction wall 10 is formed in a shape of a flat plate extending downward and continuously from the upper wall of the body casing 2. At an upper edge part of the restriction wall 10, a discharge opening 12 is formed to penetrate therethrough in the front and rear direction. The discharge opening 12 is formed, in regard to the left and right direction, to have a length permitting the sheet of paper P having the maximum size for image formation by the printer 1 to pass therethrough.

The slanting wall 11 is formed in a shape of a flat plate upwardly inclined toward the front side and is formed to extend continuously from the lower edge part of the restriction wall 10. That is, the slanting wall 11 is disposed such that the front end part thereof is situated on an upper side with respect to the rear end part thereof As shown in FIG. 2A, an extension tray reception groove 46 is formed on the slanting wall 11, and an extension tray 13 is provided for the slanting wall 11. The extension tray reception groove 46 is formed, at a front portion on the upper surface of the slanting wall 11, to be a recessed part which is recessed downward from the upper surface of the slanting wall 11 and has a rectangular shape when viewed as a plan view.

Figure 2B:
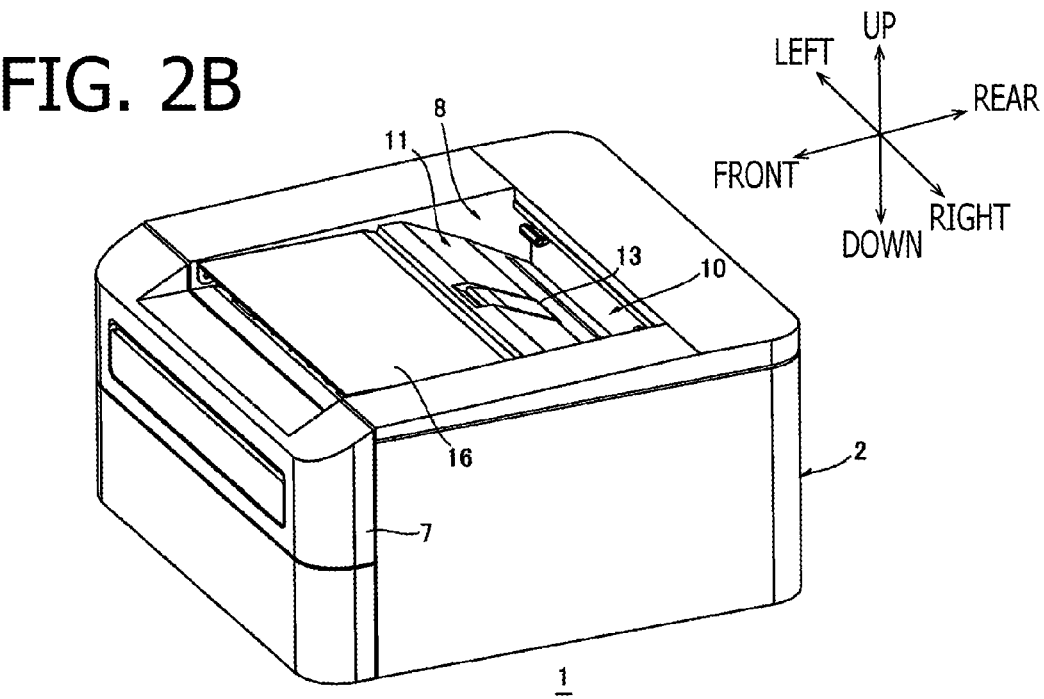
FIG. 2B is a perspective view in which the printer shown in FIG. 1 is viewed from the upper right side and the reading cover is at a closed position.

As shown in FIGS. 2A and 2B, the extension tray 13 is formed in a shape of a flat plate extending in the front and rear direction, and an end of the extension tray 13 is rotatably supported at the front end of the extension tray reception groove 46. With this configuration, the extension tray 13 is provided to be swingable between a folded position where the extension tray 13 is folded to be received by the extension tray reception groove 46 as shown in FIG. 2B and a standing position where the extension tray 13 stands to extend upward from the front end of the extension tray reception groove 46 as shown in FIGS. 1 and 2A.

As shown in FIG. 1, the reading recessed part 9 is formed as a recessed part recessed downward to the lower rear side from a position on the front side with respect to the discharge tray 8 on the upper surface of the body casing 9. The rear end of the reading recessed part 9 is situated under the front part of the slanting wall 11.

The reading recessed part 9 has a rear wall 14 and a bottom wall 15. The rear wall 14 is formed in a shape of a flat plate extending downward and is formed to continuously extend from the central portion in the front and rear direction on the lower surface of the slanting wall 11.

The bottom wall 15 is formed in a shape of a flat plate upwardly inclined toward the front side, and is formed to continuously extend from the lower end of the rear wall 14 and along the inclination of the slanting wall 11.

A reading cover 16 is provided for the reading recessed part 9. That is, the reading cover 16 is provided on the front side with respect to the extension tray 13.

As shown in FIGS. 2A and 2B, the reading cover 16 is formed as a separate member which is provided separately from the extension tray 13 and is formed in a shape of a flat plate. The reading cover 16 is provided such that one end of the reading cover 16 is rotatably supported at a front end of the reading recessed part 9. As a result, the reading cover 16 is disposed to be swingable, about the one end of the reading cover 16 as a supporting point, between a closed position where the reading cover 16 is situated to extend in the front and rear direction and to close the reading recessed part 9 from the upper side as shown in FIG. 2B and an opened position where the reading cover 16 is situated to upwardly extend toward the front side from the front end of the reading recessed part 9 and to open the reading recessed part 9 from the upper side as shown in FIGS. 1 and 2A. As shown in FIG. 2B, in the state where the reading cover 16 is situated at the closed position, the reading cover 16 and the slanting wall 11 are disposed such that the slanting wall 11 continuously connected to the reading cover 16.

(2) Paper Supply Unit

As shown in FIG. 1, the paper supply unit 3 is provided at a lower end portion of the body casing 2, and includes a paper supply tray 17, a pickup roller 18 and a first conveying path 19.

The paper supply tray 17 accommodates the sheets of paper P, and is detachably attachable to the bottom portion of the body casing 2. The pickup roller 18 is provided in the body casing 2 such that the pickup roller 18 is disposed on the upper side of the front end of the paper supply tray 17.

The first conveying path 19 is disposed on the upper front side of the pickup roller 18, and is formed in a shape of a letter "C" opened toward the rear side when viewed as a side view. The lower end of the first conveying path 19 communicates with the inner space of the paper supply tray 17 on the front side of the pickup roller 18.

The first conveying path 19 is provided with a paper supply roller 20, a paper supply pad 21 and a pair of conveying rollers 22. The paper supply roller 20 and the paper supply pad 21 are provided at the lower end part of the first conveying path 19. The paper supply roller 20 is provided on the front side with respect to the pickup roller 18, and the paper supply pad 21 is provided to contact the paper supply roller 20 from the lower front side. The pair of conveying rollers 22 are provided at a central portion in the up and down direction of the first conveying path 19, and are disposed to face with each other in the front and rear direction.

(3) Image Formation Unit

The image formation unit 4 is provided on the upper side of the paper supply unit 3, and includes a process cartridge 23, an LED unit 30 which is an example of an exposing device, a fixing unit 24 and a second conveying path 25.

The process cartridge 23 is detachably attachable to the body casing 2 through the attaching and detaching opening 6, and is attached to a position on the upper side of the paper supply tray 17 and on the lower side of the bottom wall 15 of the reading recessed part 9 in the body casing 2. The process cartridge 23 includes a drum cartridge 26 which is detachably attachable to the body casing 2, and a development cartridge 27 which is detachably attachable to the drum cartridge 26.

The drum cartridge 26 includes a drum frame 35. The drum frame 35 is formed in a shape of a box opened toward the upper side. The drum frame 35 is integrally provided, at the front end of the drum frame 35, with a grip part 36 which is gripped when the process cartridge 23 is attached to or detached from the body casing 2.

In the drum frame 35, a photosensitive drum 28, a scorotron charger 29 and a transfer roller 31 are provided. The photosensitive drum 28 has a cylindrical shape extending in the left and right direction, and is provided rotatably, in the clockwise direction when viewed from the left side, about an axis A1, at the rear end of the drum frame 35. The scorotron charger 29 is disposed to face the photosensitive drum 28 and to have a certain interval therebetween on the rear side of the photosensitive drum 28.

The transfer roller 31 is disposed on the lower side of the photosensitive drum 28 to contact the photosensitive drum 28 from the lower side. The development cartridge 27 is attached to the position on the front side of the photosensitive drum 28 in the drum frame 35. The development cartridge 29 includes a development frame 37.

The development frame 37 is formed in a shape of a box opened toward the rear side, and toner which is an example of a developer is accommodated in the inner space of the development frame 37. In the development frame 37, a development roller 32, a toner supply roller 33 and a layer thickness restriction blade 34 are provided.

The development roller 32 has a cylindrical shape extending in the left and right direction, and is disposed in a rear end portion of the development frame 37 such that a rear end part of the development roller 32 is exposed from the development frame 37. The development roller 32 is supported by the development frame 37 such that the left and right ends of the development roller 32 are rotatably supported at side walls (not shown) of the development frame 37.

The toner supply roller 33 has a cylindrical shape extending in the left and right direction, and is disposed to be pressed against the development roller 32 from the lower front side. The toner supply roller 33 is supported by the development frame 37 such that the left and right ends of the toner supply roller 33 are rotatably supported by side walls (not shown) of the development frame 37.

The layer thickness restriction blade 34 is supported by the development frame 37 such that the layer thickness restriction blade 34 contacts the development roller 32 from the upper front side.

The process cartridge 23 attached to the body casing 2 is disposed to be inclined along the inclination of the bottom wall 15 such that the rear end part of the process cartridge 23 is positioned on the lower side with respect to the front end part of the process cartridge 23. That is, the process cartridge 23 attached to the body casing 2 is disposed to be inclined to be along the reading unit 50 under the reading unit 50. As a result, the axis Al of the photosensitive drum 28 is positioned on the lower side with respect to the upper end of the grip part 36.

The LED unit 30 is provided in the body casing 2 such that the LED unit 30 faces the photosensitive drum 28 on the upper side of the photosensitive drum 28. The LED unit 30 irradiates the photosensitive drum 28 with light based on image data.

The fixing unit 24 is disposed on the rear side of the process cartridge 23 and on the lower rear side of the rear wall 14. The fixing unit 14 includes a heating roller 38 and a pressure roller 39 pressed against the heating roller 38.

The second conveying path 25 communicates with the first conveying path 19, and is disposed between the fixing unit 24 and the upper end of the first conveying path 19. The second conveying path 25 is formed to extend in the front and rear direction, and is formed to be bent slightly toward the lower side.

The second conveying path 25 has an upstream path 40 along which the sheet of paper P supplied from the first conveying path 19 is conveyed toward a nipping part N1 between the photosensitive drum 28 and the transfer roller 31, and a downstream path 41 along which the sheet of paper P which has passed the nipping part N1 is conveyed to the position between the heating roller 38 and the pressure roller 39.

The upstream path 40 is a front part of the second conveying path 25 and is provided under the process cartridge 23 such that the upstream path 40 overlaps with the attached process cartridge 23 when projected in the up and down direction.

The upstream path 40 is formed to extend continuously from the upper end of the first conveying path 19 to the nipping part N1 such that the upstream path 40 extends toward the lower rear side. That is, the front end of the upstream path 40 is disposed on the upper side relative to the rear end of the upstream path 40. Therefore, it becomes possible to dispose the upper end of the first conveying path 19, which is continuously connected to the front end of the upstream path 40, on the upper side relative to the rear end of the upstream path 40, and thereby it becomes possible to secure a large curvature radius of the first conveying path 19. As a result, it becomes possible to secure smooth supplying of the sheet of paper P from the paper supply unit 3 to the image formation unit 4.

The upstream path 40 is configured such that an upper wall of the upstream path 40 is formed by the bottom wall of the drum frame 35 and a lower wall of the upstream path 40 is formed by an upstream guide part 45. The upstream guide part 45 is provided to be inclined and to extend along the attached process cartridge 23. More specifically, the upstream guide part 45 is formed to extend from the upper front side to the lower rear side.

The upstream path 40 is provided with a pair of registration rollers 48. The pair of registration rollers 48 are provided at a central portion of the upstream path 40 in the front and rear direction, and are disposed to face with each other in the up and down direction.

The downstream path 41 is a rear portion of the second conveying path 25, and is disposed between the nipping part N1 and the fixing unit 24. The lower wall of the downstream path 41 is formed by a downstream guide part 47. The downstream guide part 47 is formed to extend upwardly to the rear side, from the position on the rear side of the transfer roller 31 to the position on the lower front side of the heating roller 38.

The upstream guide part 45 and the downstream guide part 47 function as a guide part for guiding passage of the sheet of paper P in the image formation unit 4.

(4) Discharge Unit

The discharge unit 5 is provided on the rear side of the image formation unit 4, and includes a discharge roller 42, a roller 62 and a third conveying path 43.

The discharge roller 42 and the roller 62 are provided to be exposed from the front part of the upper rear end part in the body casing 2 via the discharge opening 12. That is, the discharge roller and the roller 62 are disposed on the rear side with respect to the discharge tray 8 and the reading recessed part 9.

The discharge roller 42 and the roller 62 are disposed to face with each other such that the discharge roller 42 and the roller 62 sandwich, from the upper and lower sides, the sheet of paper discharged from the discharge opening 12.

The discharge roller 42 is rotatably provided in the counterclockwise direction about the axis A2 when viewed from the left side. The roller 62 is configured to be driven by rotation of the discharge roller 42.

The third conveying path 43 is disposed between the fixing unit 24 and the discharge roller 42, and is formed in a shape of a letter "C" opened toward the front side when viewed as a side view. Further, the third conveying path 43 is provided such that the lower end of the third conveying oath 43 is situated on the rear side of the contacting part of the heating roller 38 and the pressure roller 39, and the upper end of the third conveying path 43 is situated on the lower rear side of the discharge roller 42. The third conveying oath 43 is provided with a pair of conveying rollers 44 in a central portion in the up and down direction (5) Conveying Path The first conveying path 19, the second conveying path 25 and the third conveying path 43 from a S-shaped path formed in a shape of a letter "S" when viewed along the left and right direction.

(6) Reading Unit

The reading recessed part 9 of the body casing 2 accommodates the reading unit 50. That is, the reading unit 50 is disposed on the front side with respect to the discharge roller 42.

The reading unit 50 is provided to be inclined along the bottom wall 15 in the reading recessed part 9, and the rear end of the reading unit 50 is disposed on the lower side of the slanting wall 11 of the discharge tray 8. The reading unit 50 includes a document supply roller 52, a facing pad 53, a document pickup roller 51, a reading part 49, a presser part 64, a reversing roller 55, a first pinch roller 56, a second pinch roller 57, a document discharge roller 58 and a facing roller 63.

The document supply roller 52 is disposed on the upper side of the central portion of the bottom wall 15 in the front and rear direction. Further, the document supply roller 52 is rotatably provided about an axis A3 in the clockwise direction when viewed from the left side. The facing pad 53 is provided to contact the document supply roller 52 from the lower side.

The document pickup roller 51 is disposed on the front side of the document supply roller 52 to face the document supply roller 52 at a certain interval in the front and rear direction.

The reading part 49 is disposed on the lower rear side of the document supply roller 52 to have a certain interval with the document supply roller 52. More specifically, the reading part 49 is disposed on the lower side with respect to the slanting wall 11 of the discharge tray 8 and on the lower side of the axis A3 of the document supply roller 52.

Further, the reading part 49 includes a contact sensor 54 for reading out an image from the document D, and a glass plate 71 disposed to face the contact sensor 54 from the lower side. The glass plate 71 is formed to extend from the lower rear position to the upper front position when viewed as a side view.

The presser part 64 is disposed on the lower side with respect to the reading part 49, and includes a contact part 72 and a coil spring 73. The contact part 72 is formed in a shape of a letter U opened toward the lower front side when viewed as a side view, and is disposed to face and contact the rear part of the glass plate 71 from the lower front side. The coil spring 73 is formed as an air-core coil extending from the upper rear position to the lower front position, and is disposed to intervene between the contact part 72 and the upper surface of the bottom wall 15. With this configuration, the contact part 72 is constantly pressed to the upper rear side against the glass plate 71 by the coil spring 73, and the upper surface of the contact part 72 contacts the rear part of the lower surface of the glass plate 71. In a document reading operation described later, the document D supplied from the document supply roller 52 is supplied to the position between the rear part of the glass plate 71 and the contact part 72, and the contact sensor 54 faces the document D from the upper side via the glass plate 71.

The reversing roller 55 is disposed, at a rear end portion of the reading recessed part 9, on the rear side of the reading part 49. That is, the reversing roller 55 id disposed on the lower side with respect to the slanting wall 11 of the discharge tray 8. Further, the reversing roller 55 is rotatably provided about an axis A4 in the clockwise direction when viewed from the left side.

The reversing roller 55 is disposed between the photosensitive drum 28 and the fixing unit 24 when projected in the up and down direction, and is disposed between the fixing unit 24 and the discharge roller 42 when projected in the front and rear direction. That is, the reversing roller 55 is disposed on the front side with respect to the fixing unit 24 and on the rear side with respect to the photosensitive drum 28.

Furthermore, the reversing roller 55 is disposed such that at least a part of the reversing roller 55 is situated between the LED unit 30 and the discharge roller 42. More specifically, the reversing roller 55 is disposed to overlap with a virtual lime L connecting the upper end of the LED unit 30 with an axis A2 of the discharge roller 42, and the axis A4 of the reversing roller 55 is situated on the rear side and the lower side with respect to the virtual line L.

The first pinch roller 56 and the second pinch roller 57 are provided to sandwich therebetween the reversing roller 55 in the up and down direction. Specifically, the first pinch roller 56 is disposed to contact the reversing roller 55 from the lower side, and the second pinch roller 57 id disposed to contact the reversing roller 55 from the upper side.

The document discharge roller 58 is disposed on the upper front side of the reversing roller 55 and on the upper side of the reading part 49, and is disposed on the lower side with respect to the slanting wall 11 of the discharge tray 8. Further, the document discharge roller 58 is rotatably provided about an axis AS in the counterclockwise direction when viewed from the left side. The facing roller 63 is provided to contact the document discharge roller 58 from the lower front side.

That is, the reading part 49, the presser part 64, the reversing roller 55, the first pinch roller 56, the second pinch roller 57, the document discharge roller 58 and the facing roller 63 are disposed on the lower side of the slanting wall 11 such that they overlap with the slanting wall 11 of the discharge tray 8 when projected in the up and down direction.

In the reading unit 50, a document supply tray 59 and a document discharge tray 60 are provided. The document supply tray 59 is disposed between the document pickup roller 51 and the reading cover 16, and is formed in a shape of a flat plate extending in a direction from an upper front position to a lower rear position so that the document supply tray 59 and the reading cover 16 situated at the opened position are substantially on the same plane. As shown in FIG. 2A, the document supply tray 59 is formed to extend in the left and right direction, and the both ends of the document supply tray 59 in the left and right direction are connected to the both side walls of the reading recessed part 9.

As shown in FIG. 1, the document discharge tray 60 is formed in a shape of a flat plane extending in the front and rear direction, and is disposed on the lower front side of the document discharge roller 58 so as to cover the document supply roller 52 and the document pickup roller 51 from the upper side. Further, as shown in FIG. 2A, the document discharge tray 60 is formed to extend in the left and right direction, and the right and left ends of the document discharge tray 60 are connected to the both side walls of the reading recessed part 9.

A region between the upper surface of the document supply tray 59 and the front end of the document discharge tray 60 is formed as a document supply opening 61. The document supply opening 61 is formed to have a rectangular shape whose longer side is in the left and right direction, and the length of the document supply opening 61 in the left and right direction is larger than the length of the maximum size document which the printer 1 is able to read.

As shown in FIG. 2B, the document supply opening 61 is covered and closed by the reading cover 16 from the upper side in the state where the reading cover 16 is at the closed position. On the other hand, in the state where the reading cover 16 is at the opened position, the document supply opening 61 is opened from the upper front side.

2. Image Forming Operation

Hereafter, an image forming operation for the sheet of paper P by the printer 1 is explained. In order to from an image on the sheet of paper P in the printer 1, first the extension tray 13 is set at the standing position.

Then, an image forming operation start signal is inputted to the printer 1, for example, from a personal computer connected to the printer 1. Then, the printer 1 executes a development operation, a paper supply operation, a transfer and fixing operation and a discharge operation.

(1) Development Operation

As shown in FIG. 1, toner in the development frame 37 is supplied to the toner supply roller 33, and is further supplied to the development roller 32.

The toner supplied to the development roller 32 is positively charged by frictional charging between the toner supply roller 33 and the development roller 32, and the layer thickness of the toner is restricted by the layer thickness restriction blade 34. Then, the toner is held on the surface of the development roller 32 as a thin layer having a constant thickness.

The surface of the photosensitive drum 28 is charged positively and uniformly by the scorotron charger 29 in accordance with rotation of the photosensitive drum 28, and is exposed by the LED unit 30. As a result, an electrostatic latent image corresponding to an image to be formed on the sheet of paper P is formed on the surface of the photosensitive drum 28.

As the photosensitive drum 28 further rotates, the toner held on the development roller 32 is supplied to the electrostatic latent image on the photosensitive drum 28. As a result, a toner image is formed on the surface of the photosensitive drum 28 by a reversal development manner.

(2) Paper Supply Operation

The sheets of paper P accommodated in the paper supply tray 17 are sent to the first conveying path 19, and are supplied to the position between the paper supply roller 20 and the paper supply pad 21. The sheets of paper P supplied to the position between the paper supply roller 20 and the paper supply pad 21 are handled one by one by rotations of the paper supply roller 20, and the sheet of paper P is supplied to the position between the pair of conveying rollers 22 such that the sheet of paper P passes through the position between the paper supply roller 20 and paper supply pad 21. Then, the sheet of paper P is supplied to the image formation unit 4 by rotation of the conveying rollers 22. As a result, the sheet of paper P accommodated in the paper supply tray 17 proceeds along the first conveying path 19 while making a u-turn, and is supplied to the image formation unit 4 (i.e., to the upstream path 40 of the second conveying path 25).

The sheet of paper P supplied to the upstream path 40 is guided by the upstream guide part 45, and then reaches the position between the pair of registration rollers 48. Then, by rotation of the registration rollers 48, the sheet of paper P is conveyed to the lower rear side toward the nipping part N1 between the photosensitive drum 28 and the transfer roller 31 at predetermined timings.

(3) Transfer and Fixing Operation

The sheet of paper P reaching the nipping part N1 passes the nipping part N1 from the front side to the rear side. At this time, the toner image is transferred to the sheet of paper P, and an image is formed on the sheet of paper P.

The sheet of paper P which has passed the nipping part N1 enters the downstream path 41, and then is conveyed, to the upper rear side, toward the fixing unit 24, while being guided by the downstream guide part 47. Then, the sheet of paper P is heated and pressurized while the sheet of paper P passes through the position between the heating roller 38 and the pressure roller 39. At this time, the image, i.e., the toner image, is fixed on the sheet of paper P by heat-fixing.

(4) Discharge Operation

The sheet of paper P on which the image is fixed by the fixing unit 24 enters the third conveying path 43, and is further conveyed by rotation of the pair of conveying rollers 44 in such a manner that the sheet of paper P makes a u-turn toward the discharge roller 42.

When the sheet of paper P reaches the position between the discharge roller 42 and the roller 62, the sheet of paper P passes the discharge opening 12, from the rear side to the front side, in accordance with rotation of the discharge roller 42, and is discharged to the discharge tray 8. That is, a discharging direction X of the sheet of paper P is a direction pointing from the rear side to the front side, the upstream side of the discharging direction X is the rear side, and the downstream side of the discharging direction X is the front side.

The sheet of paper P is thus supplied from the paper supply tray 17, and is conveyed to the upper rear side while making a u-turn. Then, the sheet of paper P passes the nipping part N1 between the photosensitive drum 28 and the transfer roller 31, and passes the position between the heating roller 38 and the pressure roller 39. Thereafter, the sheet of paper P is conveyed while making a u-turn to the upper front side, and is conveyed along the conveying path formed in a shape of a letter S when viewed as a side view so that the sheet of paper P is discharged to the discharge tray 8. That is, the first conveying path 19, the second conveying path 25 and the third conveying path 43 are configured to guide movement of the sheet of paper P supplied from the paper supply unit 3 to the discharge roller 42.

Thus, the image forming operation by the printer 1 for the sheet of paper P is completed.

The sheet of paper P discharged to the discharge tray 8 is supported, from the lower side, by the slanting wall 11 and the extension tray 13, and is sequentially stacked on the slanting wall 11 as the image forming operation is repeatedly executed.

The sheet of paper P stacked on the slanting wall 11 moves to the lower rear side along the slanting wall 11 due to its own weight, and the rear edge of the sheet of paper P contacts the restriction wall 10 so that further movement of the sheet of paper P from the restriction wall 10 is restricted.

As shown in FIG. 2B, when the image forming operation executed in the state where the extension tray 13 is situated at the folded position and the reading cover 16 is situated at the closed position, the rear half part of the sheet of paper P discharged from the body casing 2 is placed on the slanting wall 11, and the front half part of the sheet of paper P is placed on the reading cover 16 situated at the closed position. That is, the reading cover 16 serves also as a discharge tray.

3. Document Reading Operation

Hereafter, a document reading operation for the document D1 on the printer 1 is explained.

In order to read the document D on the printer 1, first the extension tray 13 is set at the standing position, and the reading cover 16 is set at the opened position.

Next, the document D is stacked on the reading cover 16 and the document supply tray 59 so that an image formation surface on which an image is formed faces the upper side. Then, a reading star signal is inputted to the printer 1 from, for example, a personal computer connected to the printer 1 or an operation panel of the printer 1.

(1) Document Reading Operation

Rear edge parts of the documents D stacked on the reading cover 16 and the document supply tray 59 are introduced into the inside of the reading unit 50 via the document supply opening 61. Then, the documents D are sent to the position between the document supply roller 52 and the facing pad 53 in accordance with rotation of the document pickup roller 51. As a result, the documents D contact the lower edge of the document supply roller 52. That is, the lower edge of the document supply roller 52 serves as a contacting part N2 contacting with the document D. Subsequently, the documents D are handled one by one by rotation of the document supply roller 52, and thereafter the document D is conveyed, from the upper front side to the lower rear side, toward the position between the rear portion of the glass plate 71 and the contact part 72 so that the document D sequentially passes the position between the document supply roller 52 and the facing pad 53.

When the document D subsequently reaches the position between the rear part of the glass plate 71 and the contact part 72, the rear part of the lower surface of the glass plate 71 faces and contacts the document D in regard to the up and down direction. That is, the rear part of the lower surface of the glass plate 71 serves as a contacting part N3 which contacts the document D. The contacting part N3 of the glass plate 71 is disposed at the position lower in the vertical direction than the contacting part N2 of the document supply roller 52.

The contact sensor 54 reads out an image formed on the document D when the document D passes the position between the glass plate 71 and the contact part 72. Thus, image data of the document D is obtained. Then, based on the image data obtained by the contact sensor 54, an image is formed on the sheet of paper P by the image formation unit 4 as described above.

On the other hand, the document D which has passed through the position between the glass plate 71 and the contact part 72 is supplied to the position between the reversing roller 55 and the first pinch roller 56, and is conveyed toward the position between the reversing roller 55 and the second pinch roller 57 in such a manner that the document D makes a u-turn. That is, the reversing roller 55 reverses the conveying direction of the document D conveyed toward the reading part 49, i.e., the position between the glass plate 71 and the contact part 72.

Then, the document D which has passed the position between the reversing roller 55 and the second pinch roller 57 is conveyed toward the position between the document discharge roller 58 and the facing roller 63 in accordance with rotation of the reversing roller 55. Subsequently, when the document D reaches the position between the document discharge roller 58 and the facing roller 63, the lower edge of the document discharge roller 58 and the document D face and contact with each other in regard to the up and down direction. That is, the lower edge of the document discharge roller 58 serves as a contacting part N4 which contacts the document D. The contacting part N4 with the document discharge roller 58 is disposed at the position higher in the vertical direction that the contacting part N3 of the glass plate 71.

The document D which has reached the position between the document discharge roller 58 and the facing roller 63 is discharged to the document discharge tray 60 from the reading unit 50 in accordance with rotation of the document discharge roller 58.

Thus, the image reading operation for the document D by the printer 1 is finished.

The document D discharged to the document discharge tray 60 is supported from the lower side by the document discharge tray 60, and is sequentially stacked on the document discharge tray 60 by repeatedly executed image reading operation.

4. Advantageous Effect (1) As shown in FIG. 1, in the printer 1 the reading unit 50 is disposed on the downstream side in the discharging direction X with respect to the discharge roller 42. Therefore, it is possible to prevent the reading unit 50 and the discharge roller 42 from overlapping with each other in the up and down direction, i.e., it is possible to dispose the reading unit 50 and the discharge roller 42 not to overlap with each other in the up and down direction. As a result, it becomes possible to downsize the printer 1 in regard to the up and down direction while providing the reading unit 50 in the printer 1.

Furthermore, since the rear part of the reading unit 50 is disposed on the lower side with respect to the discharge tray 8, it is possible to secure effective arrangement of the reading unit 50 and the discharge tray 8, and thereby it becomes possible to prevent the reading unit 50 from hampering user access to the sheet of paper P stacked on the discharge tray 8.

(2) As shown in FIG. 1, the image formation unit 4 includes the fixing unit 24. Therefore, it is possible to securely fix, on the sheet of paper P, the toner image formed on the sheet of paper P.

Furthermore, since the reversing roller 55 of the reading unit 50 is disposed on the downstream side in the discharging direction X with respect to the fixing unit 24, i.e., on the front side of the fixing unit 24, it is possible to prevent the reversing roller 55 and the fixing unit 24 from overlapping with each other in the up and down direction, and thereby it becomes possible to dispose the reversing roller 55 and the fixing unit 24 not to overlap with each other in the up and down direction.

That is, it becomes possible to secure effective arrangement of the reversing roller 55 and the fixing unit 24. As a result, it becomes possible to downsize the printer 1 in regard to the up and down direction while providing the fixing unit 24 in the printer 1.

(3) As shown in FIG. 1, the image formation unit 4 includes the photosensitive drum 28. Therefore, it is possible to securely transfer the toner image to the sheet of paper P.

Further, since the reversing roller 55 of the reading unit 50 is disposed on the upstream side in the discharge direction X with respect to the photosensitive drum 28, i.e., on the rear side of the photosensitive drum 28, it is possible to prevent the reversing roller 55 and the photosensitive drum 28 from overlapping with each other in the up and down direction, and thereby it becomes possible to dispose the reversing roller 55 and the photosensitive drum 28 not to overlap with each other in the up and down direction.

That is, it is possible to secure effective arrangement of the reversing roller 55 and the photosensitive drum 28. Therefore, it becomes possible to downsize the printer 1 in regard to the up and down direction while providing the photosensitive drum 28 in the printer 1.

(4) As shown in FIG. 1, the image formation unit 4 includes the LED unit 30. Therefore, it is possible to expose the photosensitive drum 28, and thereby to form an electrostatic image on the photosensitive drum 28.

As least a part of the reversing roller 55 of the reading unit 50 is disposed between the LED unit 30 and the discharge roller 42. More specifically, the reversing roller 55 is disposed to overlap with the virtual line L connecting the upper edge of the LED unit 30 and the axis A2 of the discharge roller 42.

Therefore, it is possible to effectively use the space between the LED unit 30 and the discharge roller 42 as space for disposing the reversing roller 55, and thereby it becomes possible to secure effective arrangement of the discharge roller 42, the LED unit 30 and the reversing roller 55.

As a result, it becomes possible to downsize the printer 1 in regard to the up and down direction while providing the LED unit 30 in the printer 1.

(5) As shown in FIG. 1, in the printer 1 the first conveying path 19, the second conveying path 25 and the third conveying path 43 are provided, and the first conveying path 19, the second conveying path 25 and the third conveying path 43 form an S-shaped conveying path, i.e., a so-called S-shaped path.

Around the S-shaped path in the printer 1, space is formed. Therefore, by disposing the reading unit 50 in the space formed around the S-shaped path, it becomes possible to secure effective arrangement of the reading unit 50.

As a result, it becomes possible to further downsize the printer 1 in regard to the up and down direction while enabling the printer 1 to smoothly convey, toward the discharge roller 42, the sheet of paper P supplied from the paper supply unit 3.

In particular, since the conveying path is formed as the S-shaped path and the image formation unit 4 includes the LED unit 30, relatively large space can be secured between the LED unit 30 and the discharge roller 42. Therefore, by disposing at least a part of the reversing roller 55 in the space between the LED unit 30 and the discharge roller 42, it becomes possible to reliably secure effective arrangement of the discharge roller 42, the LED unit 30 and the reversing roller 55.

(6) The contacting part N3 on the reading part 49 contacting the document D, i.e., the rear part of the lower surface of the glass plate 71, is disposed on the lower side in the vertical direction relative to the contacting part N2 of the document supply roller 52 contacting the document D, i.e., the lower edge of the document supply roller 52. Therefore, the reading unit 50 is able to supply the document D toward the lower side in the vertical direction while the document D proceeds from the downstream side toward the upstream side in the discharge direction X.

Further, the contacting part N4 of the document discharge roller 58 contacting the document D, i.e., the lower edge of the document discharge roller 50, is disposed on the upper side in the vertical direction with respect to the contacting part N3. Therefore, it is possible to convey the document D, for which an image has been read out in the reading part 49 and for which the conveying direction has been reversed by the reversing roller 55, to proceed to the upper side in regard to the vertical direction as the document D proceeds to the downstream side in the discharging direction X from the upstream side in the discharging direction X.

As a result, it becomes possible to dispose the reading unit 50 to be inclined downward in regard to the direction from the downstream side in the discharging direction X to the upstream side in the discharging direction X, i.e., from the front side to the rear side.

Therefore, it becomes possible to securely dispose the reading unit 50 on the lower side in the vertical direction with respect to the discharge tray 8 and the downstream side in the discharging direction X with respect to the discharge roller 42.

(7) As shown in FIG. 1, the slanting wall 11 of the discharge tray 8 is disposed to be inclined such that the downstream end thereof in the discharging direction X is situated on the upper side with respect to the upstream end thereof in the discharging direction X. That is, the slanting wall 11 is disposed to be upwardly inclined toward the front side.

Therefore, the sheet of paper P stacked on the slanting wall 11 of the discharge tray 8 is also disposed to be upwardly inclined toward the front side. As a result, the sheet of paper P discharged by the discharge roller 42 moves by its own weight to the lower rear side along the inclination of the slanting wall 11, and the rear edge of the sheet of paper P contacts the restriction wall 10, so that further movement of the sheet of paper P is restricted.

Since both of the reading unit 50 and the discharge tray 8 are disposed to be upwardly inclined toward the front side, effective arrangement of the reading unit 50 and the discharge tray 8 cab be secured. Therefore, the reading unit 50 can be securely disposed on the lower side of the discharge tray 8. Therefore, the printer 1 can be securely downsized in regard to the up and down direction.

(8) As shown in FIG. 1, the process cartridge 23 attached to the body casing 2 is disposed to be inclined and to be along the reading unit 50 under the reading unit 50. Therefore, effective arrangement of the attached process cartridge 23 and the reading unit 50 can be secured.

As a result, it becomes possible to downsize the printer 1 in regard to the up and down direction while provided the process cartridge 23 in the printer 1.

(9) Since, as shown in FIG. 1, the image formation unit 4 includes the upstream guide part 45 and the downstream guide part 47, it becomes possible to secure smooth passage of the sheet of paper P in the image formation unit 4.

Since the upstream guide part 45 is formed to be along the attached process cartridge 23, it becomes possible to secure effective arrangement of the attached process cartridge 23 and the upstream guide part 45.

(10) As shown in FIG. 2A, the document supply opening 61 is formed in the reading unit 50. Therefore, as shown in FIG. 1, the document D can be securely introduced into the reading unit 50 via the document supply opening 61, and thereby the document D can be securely conveyed to the reading part 49.

Since the document D can be stacked on the reading cover 16 at the opened position during a work for executing a document reading operation, it becomes possible to smooth the work for executing the reading operation of the document D.

Figure 3A:
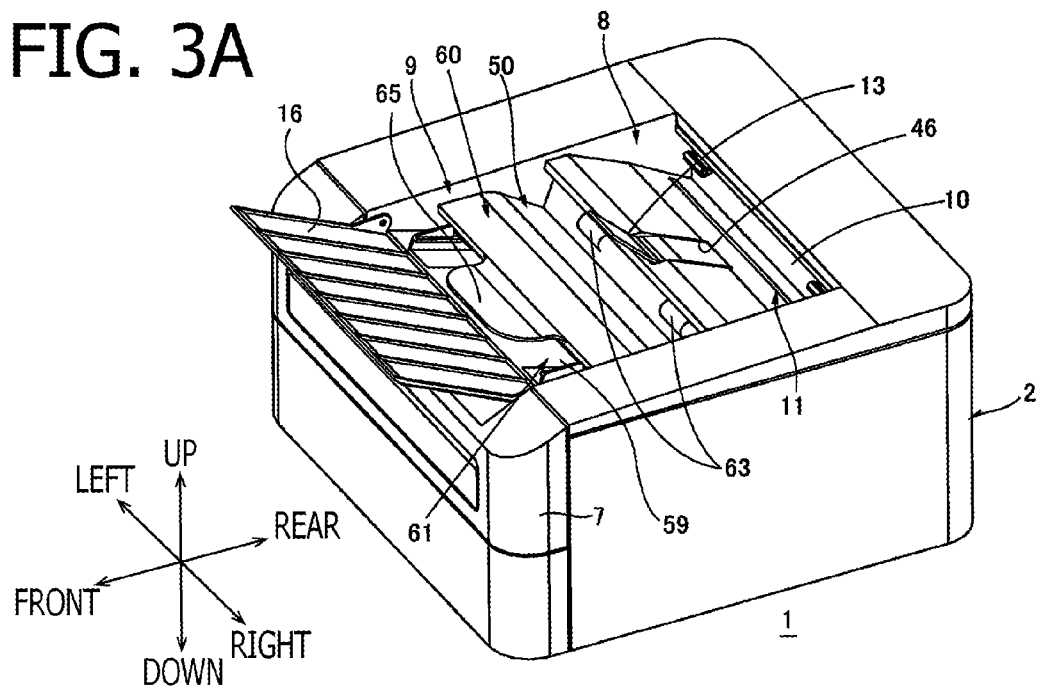
FIG. 3A is a perspective view in which a printer according to a second embodiment is viewed from the upper right side.

(11) As shown in FIG. 3A, on the upstream side (i.e., on the rear side) in the discharging direction X with respect to the reading cover 16, the discharge tray 8 is provided with the extension tray 13 which is formed to extend to the downstream side, i.e., front side, in the discharging direction X.

Therefore, the sheet of paper P stacked on the slanting wall 11 of the discharge tray 8 is supported from the lower side by the slanting wall 11 and the extension tray 13 as shown in FIG. 1. As a result, the sheet of paper P stacked on the slanting wall 11 of the discharge tray 8 can be prevented from falling to the reading cover 16 side, i.e., the front side.

Second Embodiment

FIG. 3A illustrates a printer according to a second embodiment. In the following, explanation focuses on the feature of the second embodiment. In FIG. 3A, to elements which correspond to those shown in FIGS. 1, 2A and 2B, the same reference numbers are assigned, and explanations thereof are omitted.

As shown in FIG. 3A, in the second embodiment, a projecting part 65 is integrally provided on the document discharge tray 60. The projecting part 65 is formed in a shape of a flat plate having a rectangular shape when viewed as a plan view. The projecting part 65 is formed to project frontward and continuously from the central portion in the left and right direction of the front end part of the document discharge tray 60.

According to the second embodiment, the document D discharged to the document discharge tray 60 is supported from the lower side by the document discharge tray 60 and the projecting part 65. Therefore, the document D can be securely stacked on the document discharge tray 60, and the document D discharged on the document discharge tray 60 can be prevented from falling from the document discharge tray 60 to the front side.

The second embodiment is able to achieve the same advantages as those achieved by the first embodiment.

Third Embodiment

Figure 3B:
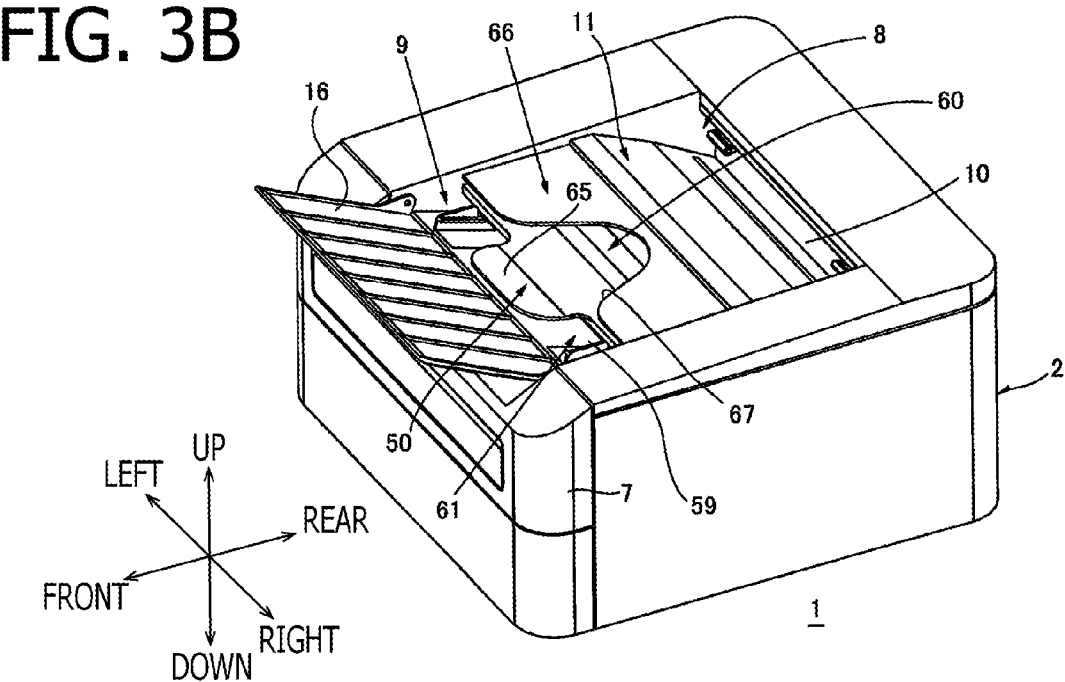
FIG. 3B is a perspective view in which a printer according to a third embodiment is viewed from the upper right side.

FIG. 3B illustrates a printer according to a third embodiment. In the following, explanation focuses on the feature of the third embodiment. In FIG. 3B, to elements which correspond to those shown in FIGS. 1, 2A, 2B and 3A, the same reference numbers are assigned, and explanations thereof are omitted.

As shown in FIG. 2A, in the first embodiment the extension tray 13 is provided on the slanting wall 11 of the discharge tray 8. In the third embodiment, an extended part 66 is integrally formed on the slanting wall 11 of the discharge tray 8.

The extended part 66 is formed in a shape of a flat plate extending to the front side to be continued from the front end of the slanting wall 11, and is disposed to face the upper surface of the document discharge tray 60 to have a certain interval therebetween. Further, the extended part 66 is disposed on the rear side with respect to the reading cover 16 situated at the opened position.

Furthermore, the extended part 66 is formed with an exposure groove 67. The exposure groove 67 is formed in a shape of a letter U when viewed as a plan view to be recessed toward the rear side from a central portion of the front edge of the extended part 66.

According to the third embodiment, since the extended part 66 is provided on the discharge tray 8, the sheet of paper P stacked on the slanting wall 11 of the discharge tray 8 can be supported from the lower side by the slanting wall 11 and the extended part 66. As a result, the sheet of paper P stacked on the slanting wall 11 of the discharge tray 9 can be prevented from falling to the front side from the discharge tray 8.

Since the exposure groove 67 is formed in the extended part 66, at least a part of the document discharge tray 60 is exposed to the upper side via the exposure groove 67. Therefore, it becomes possible to enhance visibility of the document D discharged to and sacked on the document discharge tray 60.

The third embodiment is also able to achieve the same advantages as those achieved by the first and second embodiments.

Fourth Embodiment

Figure 4:
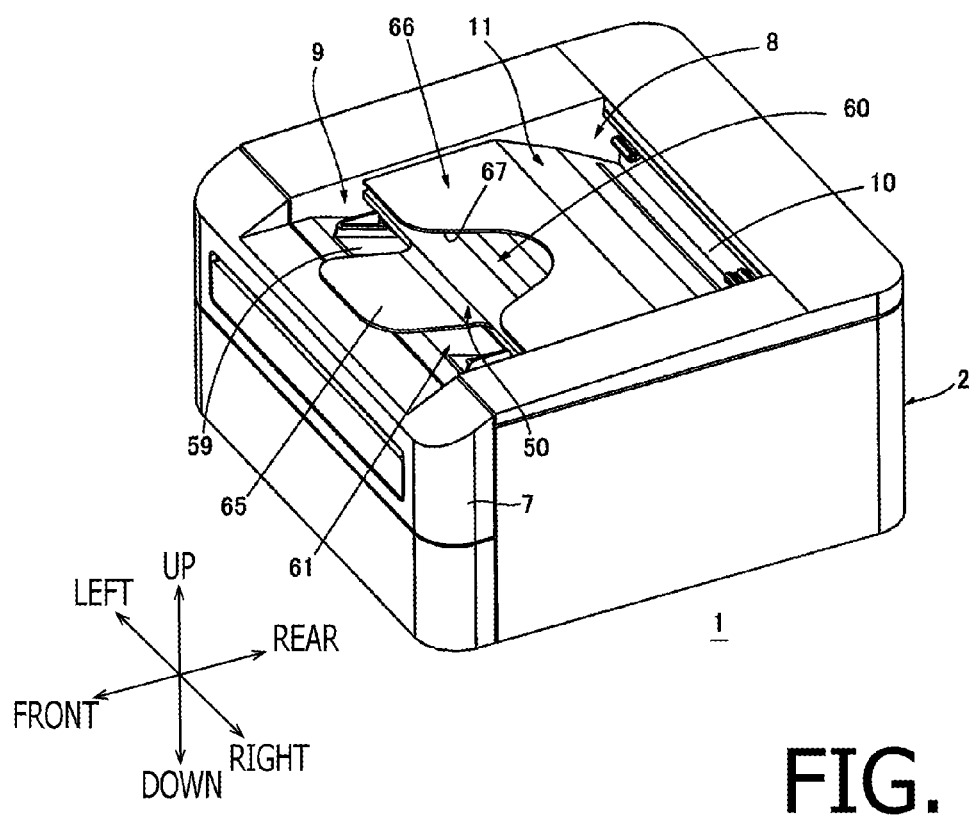
FIG. 4 is a perspective view in which a printer according to a fourth embodiment is viewed from the upper right side.

FIG. 4 illustrates a printer according to a fourth embodiment. In the following, explanation focuses on the feature of the fourth embodiment. In FIG. 4, to elements which correspond to those shown in FIGS. 1, 2A, 2B, 3A and 3B, the same reference numbers are assigned, and explanations thereof are omitted.

In the first to third embodiments, the reading cover 16 is provided in the reading recessed part 9 as shown in FIGS. 2A, 2B, 3A and 3B; however, the invention is not limited to such a configuration. In the forth embodiment, the reading cover 16 is not provided as shown in FIG. 4.

Therefore, the length of the projecting part 65 in the front and rear direction can be set longer than the projecting part 65 in the second and third embodiments. As a result, it becomes possible to more reliably stack the document D on the document discharge tray 60, and to securely prevent the document D discharged on the document discharge tray 60 from falling to the front side from the document discharge tray 60.

The fourth embodiment is able to achieve the same advantages as those achieved by the first to third embodiments.

Fifth Embodiment

Figure 5:
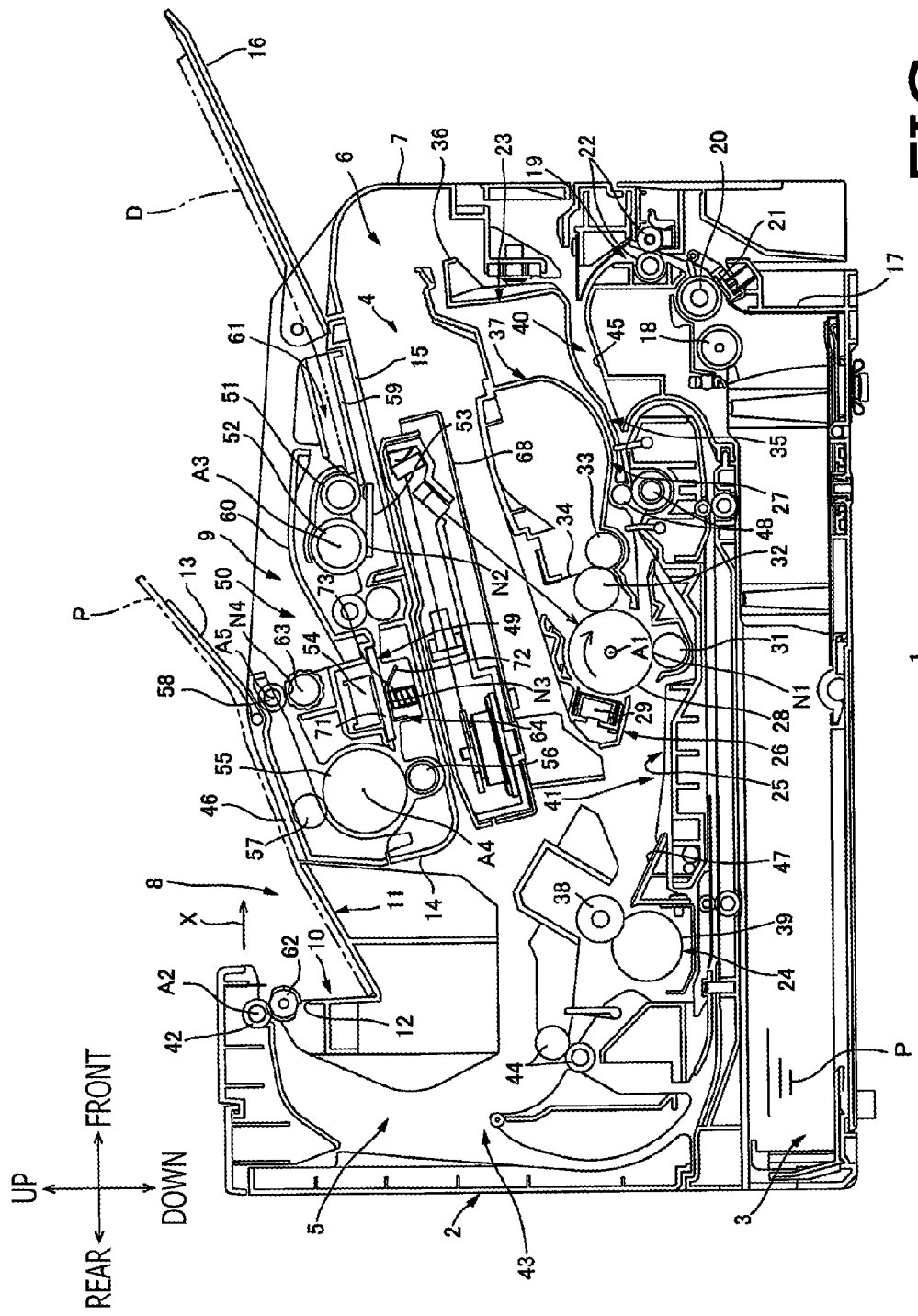
FIG. 5 is a cross section of a central portion of a printer according to a fifth embodiment.

FIG. 5 illustrates a printer according to a fifth embodiment. In the following, explanation focuses on the feature of the fifth embodiment. In FIG. 5, to elements which correspond to those shown in FIGS. 1, 2A and 2B, the same reference numbers are assigned, and explanations thereof are omitted.

In the first to fourth embodiments, the LED unit 30 is provided in the body casing 2 as shown in FIG. 1; however, in the fifth embodiment, a scanner unit 68 is provided in the body casing 2.

The scanner unit 69 is disposed in the body casing 2 between the process cartridge 23 in the attached state and the bottom wall 15 of the reading recessed part 9 in regard to the up and down direction. The scanner unit 68 emits a laser beam to the photosensitive drum 28 based on image data so as to expose the photosensitive drum 28. In the fifth embodiment, at least a part of the reversing roller 55 is also disposed between the scanner unit 69 and the discharge roller 42.

The fifth embodiment is also able to achieve the same advantages as those of the first embodiment.

Sixth Embodiment

Figure 6:
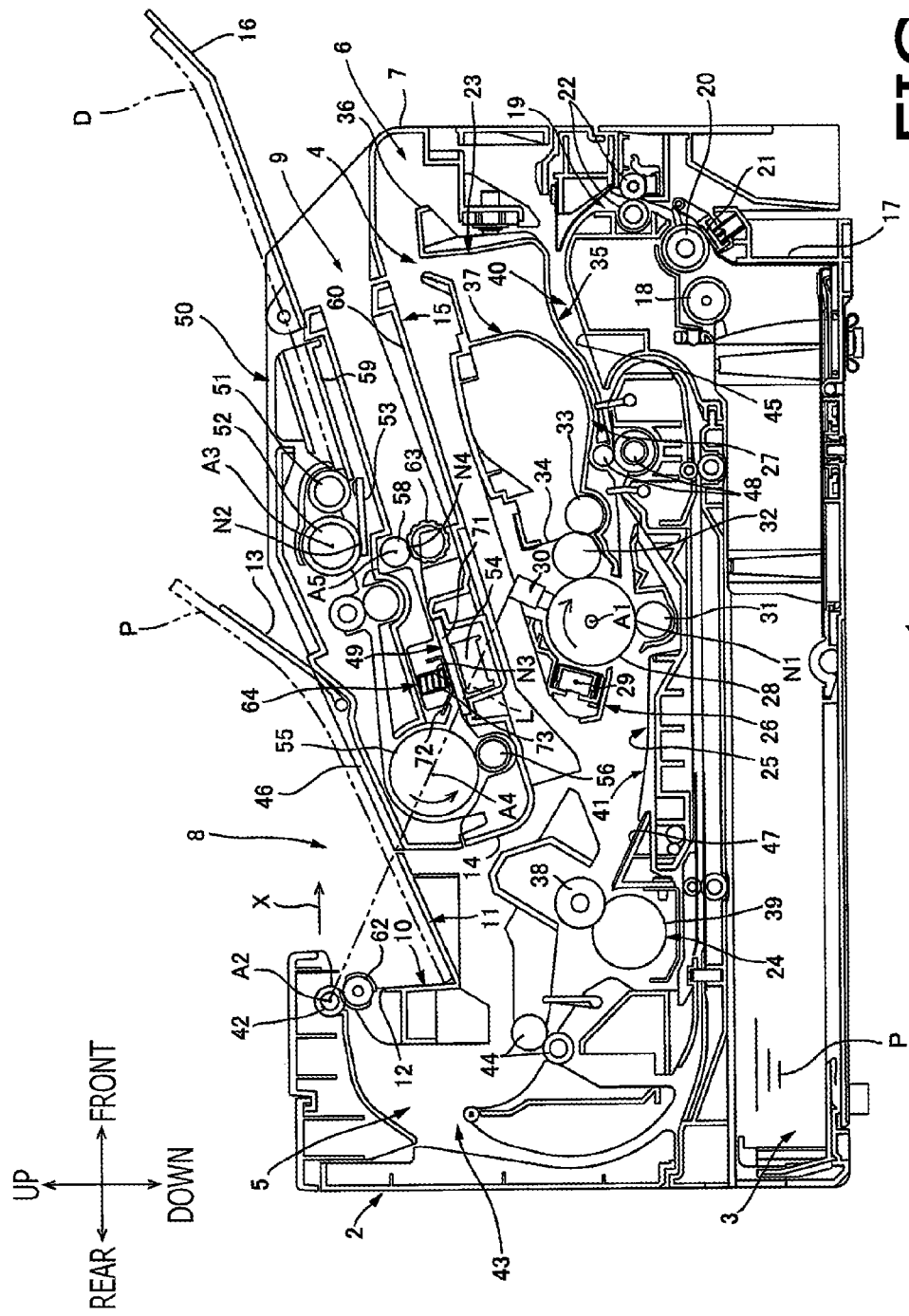
FIG. 6 is a cross section of a central portion of a printer according to a sixth embodiment.

FIG. 6 illustrates a printer according to a sixth embodiment. In the following, explanation focuses on the feature of the sixth embodiment. In FIG. 6, to elements which correspond to those shown in FIGS. 1, 2A and 2B, the same reference numbers are assigned, and explanations thereof are omitted.

As shown in FIGS. 1 and 5, in the first to fifth embodiments, the document supply tray 59 is disposed on the lower side with respect to the document discharge tray 60 in the reading unit 50; however, the invention is not limited to such a configuration, and the relative position of the document supply tray 59 and the document discharge tray 60 may be switched. Specifically, in the sixth embodiment, the document supply tray 59 is disposed on the upper side with respect to the document discharge tray 60 in the reading unit 50.

In this case, the document supply roller 52 is provided in the central portion of the upper portion in the reading recessed part 9. The reversing roller 55 is provided at the rear end portion in the reading recessed part 9 and on the lower rear side with respect to the document supply roller 52, and is provided rotatably about the axis A4 in the counterclockwise direction when viewed as a left side view.

The reading part 49 is provided on the lower front side of the reversing roller 55, and the glass plate 71 is disposed on the upper side of the contact sensor 54. The presser part 64 is provided on the front side of the reversing roller 55 and on the upper side of the reading part 49. The contact part 72 is disposed to face and contact the front part of the glass plate 71 from the upper rear side. The coil spring 73 is disposed on the upper side of the contact part 72, and constantly presses the contact part 72 to the lower front side, i.e., to the glass plate 71. As a result, the lower surface of the contact part 72 and the front part of the upper surface of the glass plate 71 constantly contact with each other.

The document discharge roller 58 is disposed on the lower side of the document supply roller 52 and on the upper front side of the reading part 49. Further, the document discharge roller 58 is provided rotatably about the axis A5 in the counterclockwise direction when viewed as a left side view.

The front part of the upper surface of the bottom wall 15 of the reading recessed part 9 with respect to the document discharge roller 58 is partitioned as the document discharge tray 60.

In the sixth embodiment having the above described configuration, the document D stacked on the reading cover 16 and the document supply tray 59 is introduced into the reading unit 50 by rotation of the document pickup roller 51 and the document supply roller 52, and passes through the position between the contact part 72 and the rear part of the upper surface of the glass plate 71 after being reversed by the reversing roller 55. That is, the rear part of the upper surface of the glass plate 71 serves as the contacting part N3 which faces and contacts the document D.

The contact sensor 54 reads out an image from the document D when the document D passes the position between the glass plate 71 and the contact part 72. Then, the document D which has passed the position between the glass plate 71 and the contact part 72 is discharged and stacked on the discharge tray 60 from the reading unit 50.

The sixth embodiment is also able to achieve the same advantages as those achieved by the first embodiment.

It should be understood that the features described in the first to sixth embodiments can be suitably combined.

What is claimed is:

1. An image forming apparatus, comprising:
    a housing;
    an image formation unit that is provided in the housing and is configured to form an image on a recording medium;
    a stacking tray configured such that the recording medium on which an image has been formed by the image formation unit is stacked;
    a discharge roller configured to discharge, to the stacking tray, the recording medium on which an image has been formed by the image formation unit; and
    a reading device comprising a reading unit configured to read out an image formed on a document and a reversing unit configured to reverse a conveying direction of the document,
    wherein the reading device is disposed on a lower side in a vertical direction with respect to the stacking tray and on a downstream side, with respect to the discharge roller, in a discharging direction in which the recording medium is conveyed by the discharge roller.

2. The image forming apparatus according to claim 1, wherein:
    the image formation unit comprises a fixing unit configured to fix, to the recording medium, a developer image formed on the recording medium; and
    the reversing unit is disposed on a downstream side in the discharging direction with respect to the fixing unit.

3. The image forming apparatus according to claim 1, wherein:
    the image formation unit comprises a photosensitive body configured to hold a developer image to be transferred to the recording medium; and
    the reversing unit is disposed on an upstream side in the discharging direction with respect to the photosensitive body.

4. The image forming apparatus according to claim 3, wherein:
    the image formation unit comprises an exposing device configured to expose the photosensitive body; and
    at least a part of the reversing unit is disposed between the exposing device and the discharge roller.

5. The image forming apparatus according to claim 1, further comprising:
    a supply unit configured to supply the recording medium to the image formation unit; and
    a conveying path configured to guide movement of the recording medium supplied from the supply unit and proceeding to the discharge roller,
    wherein the conveying path is formed in an S-shape when viewed along a direction which is perpendicular to both of the discharging direction and the vertical direction.

6. The image forming apparatus according to claim 1, wherein the reading device comprises:
    a supply roller configured to supply the document, toward the reading unit, from a downstream side in the discharging direction to an upstream side in the discharging direction; and
    a discharge roller configured to discharge, from the reading device, the document for which the image has been read by the reading unit, wherein:
    the reading unit is configured to read out the image formed on the document when the reading unit contacts the document supplied from the supply roller; and
    a contacting part of the reading unit contacting the document is disposed on a lower side in the vertical direction with respect to a contacting part of the supply roller contacting the document and a contacting part of the discharge roller contacting the document.

7. The image forming apparatus according to claim 6, wherein the stacking tray is disposed to be inclined such that a downstream end of the stacking tray in the discharging direction is situated on an upper side with respect to an upstream end of the stacking tray in the discharging direction.

8. The image forming apparatus according to claim 6, wherein:
    the image formation unit comprises a cartridge configured to accommodate a developer to be supplied to the recording medium and to be detachably attachable to the housing; and
    the cartridge attached to the housing is disposed to be inclined and to be along the reading device on a lower side in the vertical direction with respect to the reading device.

9. The image forming apparatus according to claim 8, wherein:
    the image formation unit comprises a guide part configured to guide movement of the recording medium passing inside the image formation unit; and
    a part of the guide part overlapping with the cartridge attached to the housing when projected in the vertical direction is disposed to be inclined and to be along the cartridge attached to the housing.

10. The image forming apparatus according to claim 1, wherein:
    the reading device is formed with an opening through which the document is introduced into the reading unit;
    the housing comprises a cover member configured to be movable between an opened position where the opening is opened and a closed position where the opening is closed; and
    the cover member is configured to be able to stack thereon the document when the cover member is at the opened position.

11. The image forming apparatus according to claim 10, wherein:
    the stacking tray comprises an extension tray provided on an upstream side in the discharging direction with respect to the cover member; and
    the extension tray is configured as a member separately provided from the cover member and is formed to extend to a downstream side in the discharging direction.

* * * * *